US008572395B2

(12) United States Patent
Ito

(10) Patent No.: US 8,572,395 B2
(45) Date of Patent: Oct. 29, 2013

(54) INFORMATION PROCESSING APPARATUS, AUTHENTICATION METHOD, AND COMPUTER PROGRAM

(75) Inventor: Daisuke Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1072 days.

(21) Appl. No.: 11/555,625

(22) Filed: Nov. 1, 2006

(65) Prior Publication Data

US 2007/0106905 A1 May 10, 2007

(30) Foreign Application Priority Data

Nov. 4, 2005 (JP) .................................. 2005-321018

(51) Int. Cl.
G06F 21/00 (2013.01)
H04L 9/32 (2006.01)
G06K 9/00 (2006.01)

(52) U.S. Cl.
USPC ............... 713/185; 713/182; 713/186; 726/6; 726/9; 382/115; 358/1.14

(58) Field of Classification Search
USPC .......... 713/182, 184–186; 726/5, 6, 9, 16, 18, 726/20; 382/115, 117; 340/5.82; 358/1.14
See application file for complete search history.

(56) References Cited

U.S. PATENT DOCUMENTS

| 5,633,932 | A | * | 5/1997 | Davis et al. | 713/176 |
|---|---|---|---|---|---|
| 6,378,070 | B1 | * | 4/2002 | Chan et al. | 713/155 |
| 6,751,734 | B1 | * | 6/2004 | Uchida | 713/186 |
| 6,957,338 | B1 | * | 10/2005 | Sumino | 713/186 |
| 7,028,013 | B2 | * | 4/2006 | Saeki | 705/64 |
| 7,185,198 | B2 | * | 2/2007 | Nakamura et al. | 713/168 |
| 7,725,562 | B2 | * | 5/2010 | Blakley et al. | 709/219 |
| 8,166,531 | B2 | * | 4/2012 | Suzuki | 726/9 |
| 2003/0012415 | A1 | | 1/2003 | Cossel | |
| 2003/0131110 | A1 | | 7/2003 | Chang et al. | |
| 2003/0158949 | A1 | | 8/2003 | Miller et al. | |
| 2005/0094195 | A1 | | 5/2005 | Sakamoto et al. | |
| 2005/0114696 | A1 | | 5/2005 | Hashimoto | |
| 2006/0136741 | A1 | * | 6/2006 | Mercredi | 713/185 |

FOREIGN PATENT DOCUMENTS

| JP | 2000-020471 A | 1/2000 |
|---|---|---|
| JP | 2002-288139 A | 10/2002 |
| JP | 2004-151863 A | 5/2004 |
| JP | 2005-050103 A | 2/2005 |
| JP | 2005-078203 A | 3/2005 |
| JP | 2005-141313 A | 6/2005 |
| JP | 2005-158032 A | 6/2005 |
| WO | 03/100629 A1 | 12/2003 |
| WO | WO 03100629 A1 * | 12/2003 |

* cited by examiner

*Primary Examiner* — Zachary A Davis
(74) *Attorney, Agent, or Firm* — Canon U.S.A., Inc. IP Division

(57) ABSTRACT

An information processing apparatus is configured to authenticate a user. In one embodiment, the information processing apparatus includes a storage unit that stores user identification information in association with user authentication information. Identification information for identifying a user is inputted into the apparatus. If the inputted identification information matches the stored user identification information, the apparatus selects the user authentication information associated with the user identification information that matches the inputted identification information, and sends the selected user authentication information to an authentication server, so that authentication is executed. If the inputted identification information does not match the stored user identification information, the apparatus requires that authentication information be provided by the user. In this case, the apparatus sends the inputted user authentication information to the authentication server, so that authentication is executed; and upon authentication, the apparatus stores the inputted user identification information in association with the inputted user authentication information.

15 Claims, 6 Drawing Sheets

FIG. 3

|  | ID | USER AUTHENTICATION INFORMATION | | | |
|---|---|---|---|---|---|
| DATA No | ID | USER NAME | PASSWORD | DOMAIN | ... |
| 1 | 1111aaaa5555bbbb | ito | ito001 | hoge.hoge.co.jp | ... |
| 2 | 2222cccc6666dddd | sato | sato002 | hoge.hoge.co.jp | ... |
| 3 | 3333eeee7777ffff | kato | kato003 | hoge.hoge.co.jp | ... |
| 4 | 4444gggg8888hhhh | suto | suto004 | hoge.hoge.co.jp | ... |
| 5 | 5555iiii9999jjjj | muto | muto005 | hoge.hoge.co.jp | ... |
| ... | ... | ... | ... | ... | ... |

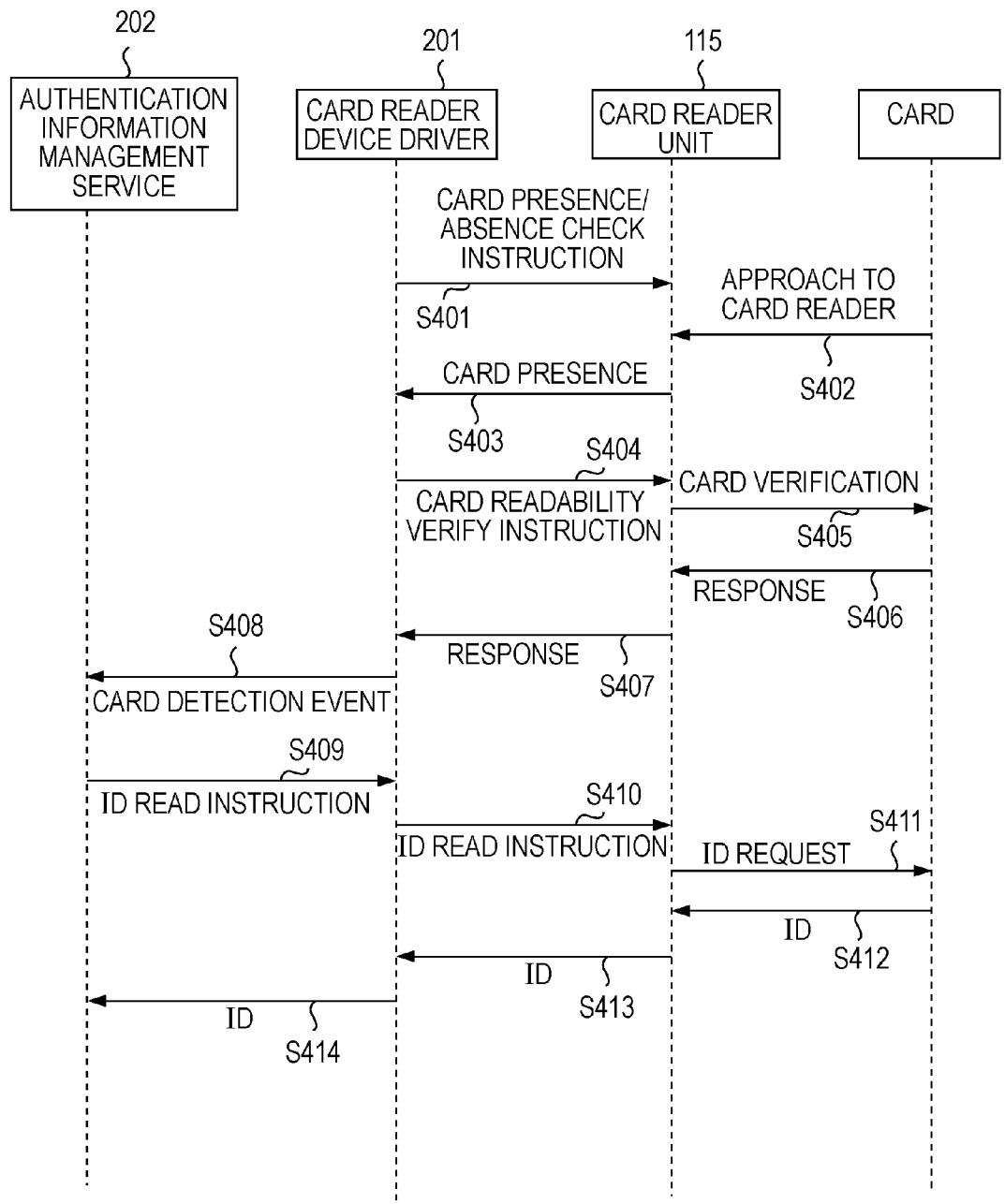

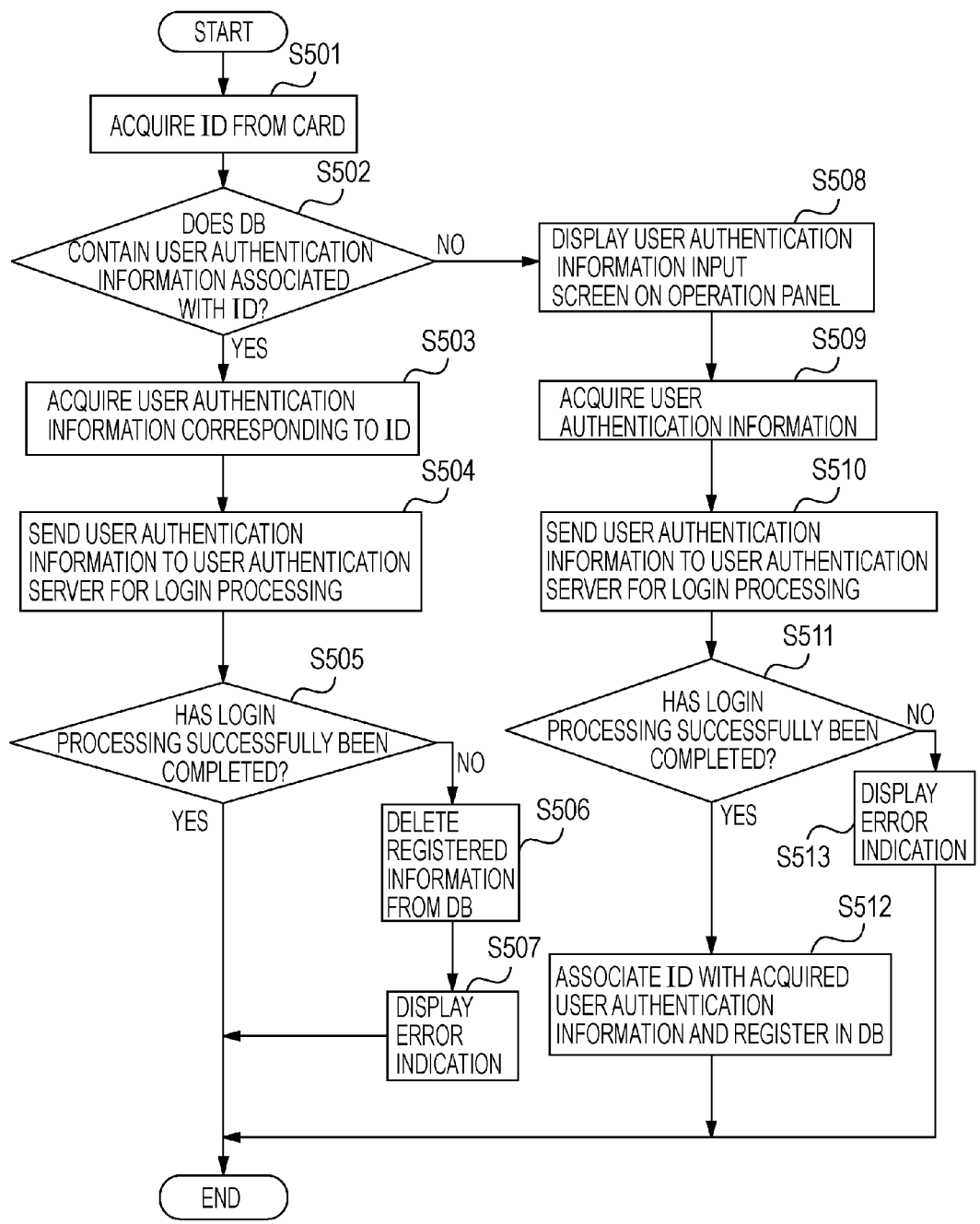

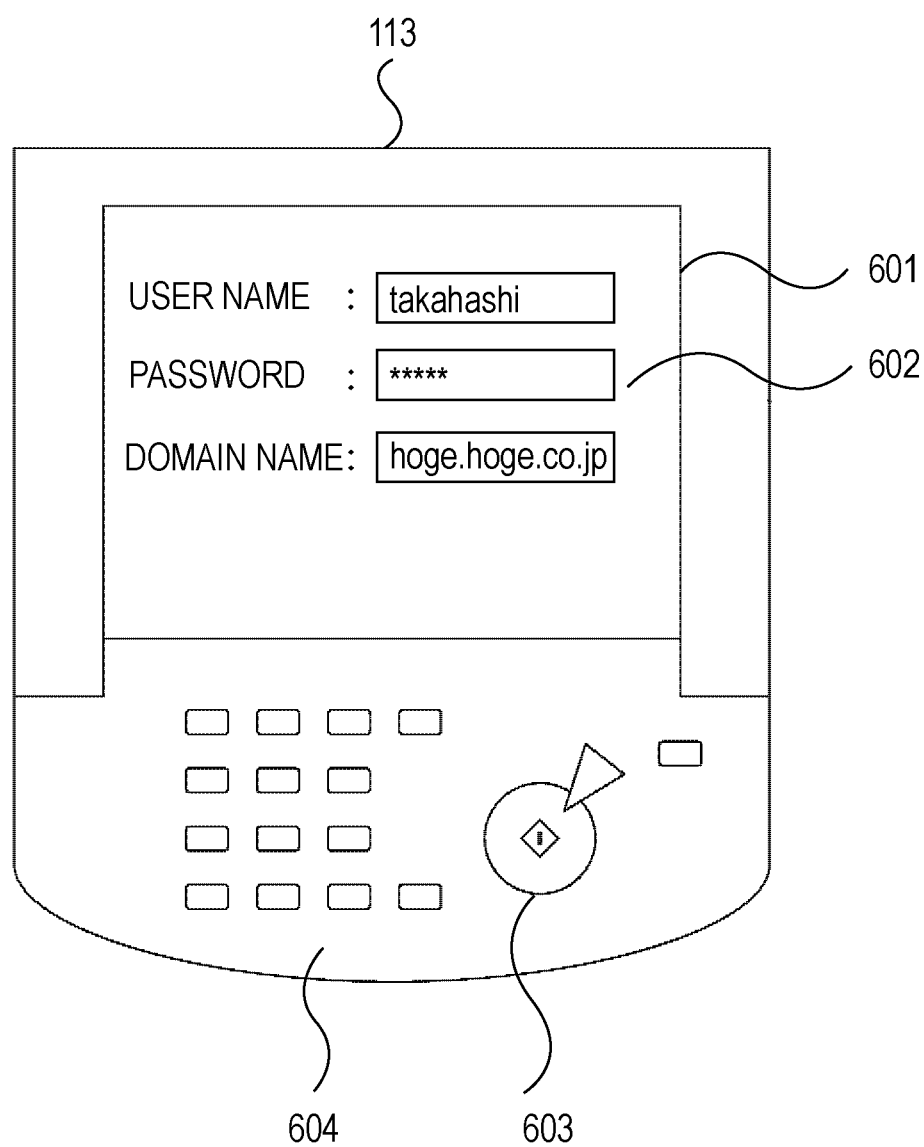

INFORMATION PROCESSING APPARATUS, AUTHENTICATION METHOD, AND COMPUTER PROGRAM

CROSS-REFERENCE TO RELATED APPLICATIONS

This application claims the benefit of Japanese Application No. 2005-321018 filed Nov. 4, 2005, which is hereby incorporated by reference herein in its entirety.

BACKGROUND OF THE INVENTION

1. Field of the Invention

The present invention relates to an information processing apparatus, an authentication method, and a computer program for storing authentication information in storing means.

2. Description of the Related Art

Information processing apparatuses which perform authentication for restricting access to specific information are known. An example of such information processing apparatuses is described in, for example, Japanese Patent Laid-Open No. 2000-020471. In the authentication performed in this information processing apparatus, a user name stored in a card and a password input by an operator are sent to a server for performing authentication on the basis of the user name and the password.

Japanese Patent Laid-Open No. 2005-158032 describes an information processing apparatus which implements an authentication method in which a pair of a user ID and a password is stored in association with one or a plurality of pairs of a login ID and a password. In this information processing apparatus, when the user ID and password are received from an external apparatus, login processing is performed for an application service provider using the login ID and password corresponding to the received user ID and password.

In order to perform authentication on the basis of authentication information corresponding to input identification information, it is necessary that the input identification information and the authentication information used for the authentication be associated with each other.

Thus, it is necessary that authentication information be associated with identification information before the identification information is input in the authentication performed in the known information processing apparatuses described above.

For example, in order for a user to input identification information using an IC card, it is necessary that the identification information and corresponding authentication information be registered in a database or the like in advance. Thus, authentication cannot be performed if the authentication information has not been registered. In this case, the user has to wait until the identification information and authentication information are registered in the database in association with each other. Then, the user has to input the identification information using the IC card to enable the authentication.

SUMMARY OF THE INVENTION

The present invention has been made in view of the above circumstances. Accordingly, there is a need for means for associating identification information with authentication information, which increases operability in authentication processing.

An information processing apparatus according to an exemplary embodiment of the present invention includes; identification information inputting means configured to input identification information; authentication controlling means configured to, if authentication information corresponding to the identification information input by the identification information inputting means has been stored in storing means, perform control so that authentication is executed on the basis of the authentication information; authentication information inputting means configured to, if the authentication information corresponding to the identification information input by the identification information inputting means has not been stored in the storing means, input authentication information; and storage controlling means configured to, if the authentication information corresponding to the identification information input by the identification information inputting means has not been stored in the storing means, store in the storing means the authentication information input by the authentication information inputting means and the identification information input by the identification information inputting means so as to be associated with each other.

An authentication method according to an exemplary embodiment of the present invention includes the steps of: inputting identification information; if authentication information corresponding to the identification information input in the identification information inputting step has been stored in storing means, performing control so that authentication based on the authentication information is executed; if the authentication information corresponding to the identification information input in the identification information inputting step has not been stored in the storing means, inputting authentication information; and, if the authentication information corresponding to the identification information input in the identification information inputting step has not been stored in the storing means, storing the authentication information input in the authentication information inputting step and the identification information input in the identification information inputting step so as to be associated with each other.

A computer readable storage medium storing thereon a computer program according to an exemplary embodiment of the present invention causes a computer to execute the steps of: inputting identification information: if authentication information corresponding to the identification information input in the identification information inputting step has been stored in a database, performing control so that authentication based on the authentication information is executed: if the authentication information corresponding to the identification information input in the identification information inputting step has not been stored in the database, inputting authentication information: and, if the authentication information corresponding to the identification information input in the identification information inputting step has not been stored in the database, storing the authentication information input in the authentication information inputting step and the identification information input in the identification information inputting step so as to be associated with each other.

Further features of the present invention will become apparent from the following description of exemplary embodiments with reference to the attached drawings.

BRIEF DESCRIPTION OF THE DRAWINGS

FIG. 3 illustrates an example of data stored and managed in a database according to an exemplary embodiment of the present invention.

FIG. 4 is a sequence diagram illustrating an information processing method for inputting a card ID.

FIG. 5 is a flowchart illustrating an operation procedure of an information processing method according to an embodiment of the present invention.

FIG. 6 illustrates an example of an input screen displayed on an operation display unit according to an exemplary embodiment of the present invention.

DESCRIPTION OF THE EMBODIMENT

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
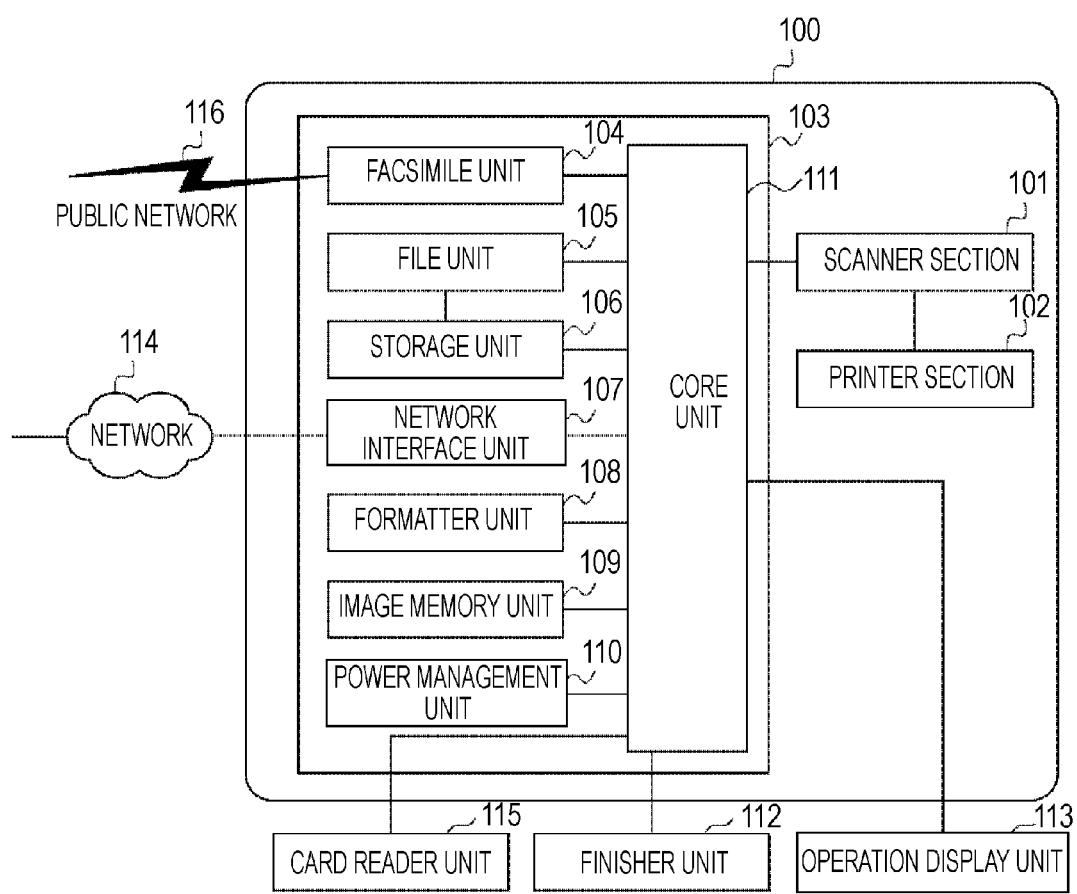
FIG. 1 is a block diagram illustrating an information processing apparatus according to an exemplary embodiment of the present invention.

FIG. 1 is a block diagram illustrating an information processing apparatus according to an exemplary embodiment of the present invention. In this exemplary embodiment, a multifunction apparatus 100 serves as an example of the information processing apparatus. The multifunction apparatus 100 has a scanner function, a printer function, a copier function, and a facsimile function. The multifunction apparatus 100 is capable of communicating with external network nodes via a network 114. The multifunction apparatus 100 can also communicate with external communication apparatuses via a public network 116.

The information processing apparatus according to an exemplary embodiment of the present invention is not limited to the multifunction apparatus 100. The information processing apparatus can be a printing apparatus or a scanning apparatus such as a digital copier, a printer with a copier function, a facsimile, and a printer.

The multifunction apparatus 100 primarily includes a scanner section 101, a printer section 102, and a control section 103.

The scanner section 101 is connected to the printer section 102 and the control section 103. The scanner section 101 reads an image of an original document, generates image data of the read image, and outputs the image data to the printer section 102 or the control section 103. The printer section 102 prints out an image on a recording sheet on the basis of the image data fed from the scanner section 101 or the control section 103.

The control section 103 is connected to the network 114 and the public network 116 and performs input/output of image data through these networks. The control section 103 also stores an amount of usage of the multifunction apparatus 100, such as the number of sheets for copying, the number of sheets for printing, the number of sheets for scanning, etc., when the multifunction apparatus 100 is used by a user.

The control section 103 includes a facsimile unit 104, a file unit 105, a storage unit 106, a network interface unit 107, a formatter unit 108, an image memory unit 109, a power management unit 110, and a core unit 111.

The facsimile unit 104, connected to the core unit 111 and the public network 116, expands compressed image data received from the public network 116 and sends the expanded image data to the core unit 111. The facsimile unit 104 also compresses image data sent from the core unit 111 and sends the compressed image data to an external apparatus via the public network 116.

The file unit 105 is connected to the core unit 111 and the storage unit 106. The file unit 105 compresses image data sent from the core unit 111 and stores in the storage unit 106 the compressed image data and a keyword used for searching the image data. In this exemplary embodiment, a hard disk drive is used as the storage unit 106. However, the storage unit 106 is not limited to being a hard disk drive. The file unit 105 searches the compressed image data stored in the storage unit 106 on the basis of a keyword sent from the core unit 111. Then, the file unit 105 reads the compressed image data found in the search operation, expands the compressed image data, and sends the expanded image data to the core unit 111.

The formatter unit 108, connected to the core unit 111, expands data described in a PDL (Page Description Language) into image data so that the image data can be processed in the printer section 102.

The image memory unit 109 temporarily stores information from the scanner section 101 and information received via the network interface unit 107.

The core unit 111 controls a card reader unit 115 which serves to send/receive information to and from a card. This card can be an IC card, for example, which is capable of storing information. The card reader unit 115 can be a contact card reader or a non-contact card reader.

The core unit 111 controls data or the like which is sent/received between the scanner section 101, the facsimile unit 104, the file unit 105, the network interface unit 107, and the formatter unit 108. When performing the data control, the core unit 111 analyzes job control data or stores information necessary for managing the usage status for each user. The information includes the number of sheets for copying, the number of sheets for printing, the number of sheets for scanning, etc.

The power management unit 110 manages power supply to the core unit 111. For example, when the multifunction apparatus 100 enters into a power saving mode, the power management unit 110 imposes a limit on the amount of the power supply to the core unit 111 so as to reduce power consumption.

A finisher unit 112 serves to eject a sheet on which an image has been printed by the printer section 102. An operation display unit 113 displays an operation screen for operating the multifunction apparatus 100, an input screen for inputting information, or a screen indicating an error occurred in the multifunction apparatus 100. The operation display unit 113 has a key and a button serves to input an operation request from a user.

Figure 2:
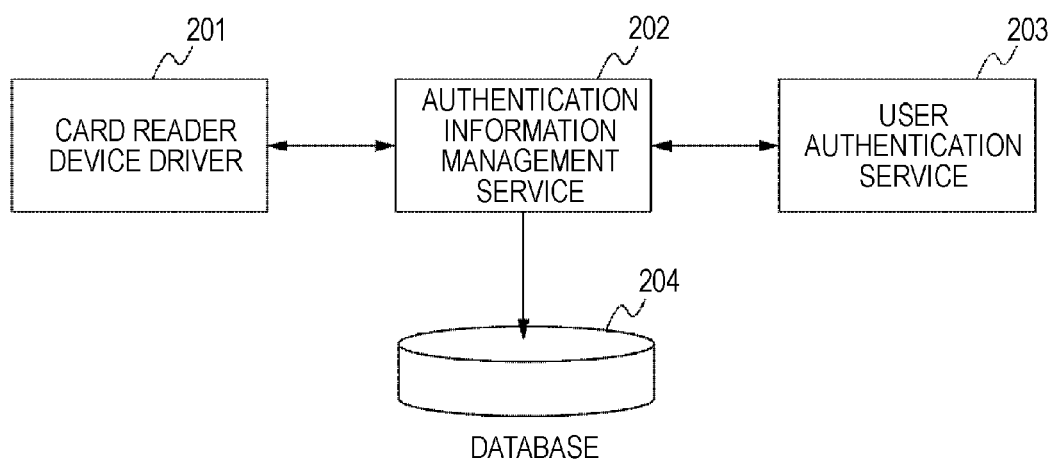
FIG. 2 illustrates an example of a software structure for controlling a core unit according to an exemplary embodiment of the present invention.

Referring to FIG. 2, an example of a software structure for controlling the core unit 111 is illustrated. A program associated with each element in the figure is executed by a computer in the core unit 111 so that an information processing method described below is implemented.

A card reader device driver 201 serves to directly control the card reader unit 115 and is capable of sending and receiving information to and from an authentication information management service 202.

The authentication information management service 202 manages information received from the card reader device driver 201 and information sent/received to and from a user authentication service 203 in association with each other, using a database 204.

The user authentication service 203 communicates with an external user authentication server using user authentication information received from the authentication information management service 202, so that user authentication is executed.

FIG. 3 illustrates an example of data stored and managed in the database 204.

Data to be stored and managed is generally divided into identification information (hereinafter referred to as an ID) which is unique to a card and user authentication information. The user authentication information includes information indicating a user name, information indicating a password, information indicating a domain name, etc. The ID, user name, password, and domain name are stored in association with each other. For example, in the data of Data No "1" in the figure, the user authentication information corresponding to an ID "1111aaaa5555bbbb" has a user name "ito", a password "ito001", a domain name "hoge.hoge.co.jp", etc. The domain name indicates a user authentication server in which user authentication is performed on the basis of the user name and the password. These data elements can be added, edited, and deleted in accordance with a request from the authentication information management service 202. Needless to say, the data stored and managed in the database 204 is not limited to having such a structure as illustrated above, and any data structure can be applied, as long as the data elements are appropriately managed.

FIG. 4 is a sequence diagram illustrating an operation sequence of an information processing method for inputting the ID of a card, according to an exemplary embodiment of the present invention.

The card reader device driver 201 instructs the card reader unit 115 to regularly check for the presence or absence of the card, at STEP S401. For example, when the card is placed inside or in the vicinity of the card reader unit 115, the card reader unit 115 detects the presence of the card, at STEP S402. Then, at STEP S403, the card reader unit 115 sends the card reader device driver 201 event information indicating that the card is present.

Upon receiving the event information indicting the presence of the card, the card reader device driver 201 instructs the card reader unit 115 to verify that the card is readable, at STEP S404. In response to the instruction, the card reader unit 115 sends a verify command to the card, at STEP S405. At STEP S406, the card sends a response to the verify command to the card reader unit 115. Then, at STEP S407, the card reader unit 115 sends the card reader device driver 201 the response received from the card.

The card reader device driver 201 analyzes the received response so as to determine whether or not the response indicates that the card is readable. When it is determined that the card is readable, the card reader device driver 201 sends the authentication information management service 202 event information indicating that the card has been detected, at STEP S408.

Upon receiving the event information indicating the card detection, the authentication information management service 202 send the card reader device driver 201 an instruction for reading the ID, at STEP S409. The card reader device driver 201 instructs the card reader unit 115 to read the ID in accordance with the read instruction, at STEP S410. Then, the card reader unit 115 sends a request for the ID to the card, at STEP S411.

In response to the ID request, the card sends the ID stored therein, to the card reader unit 115, at STEP S412. Then card reader unit 115 sends the received ID to the card reader device driver 201, at STEP S413. Then, the card reader device driver 201 sends the ID to the authentication information management service 202, at STEP S414.

By performing the above procedure, the authentication information management service 202 can acquire a card ID stored in a card.

FIG. 5 is a flowchart illustrating an information processing method according to an exemplary embodiment of the present invention. This flowchart primarily illustrates an operation procedure performed by the authentication information management service 202 for achieving user authentication which is performed after a user places a card onto or around the card reader unit 115. This procedure is initiated when the authentication information management service 202 receives event information indicating a card has been detected.

Upon receiving the event information indicating the card detection, the authentication information management service 202 acquires an ID stored in the card, at STEP S501. For the acquisition of the card ID, the operations of STEP S409 to S414 described above with reference to FIG. 4 are carried out.

At STEP S502, the authentication information management service 202 determines whether or not user authentication information corresponding to the acquired ID is stored in the database 204. In the determination operation of STEP S502, the authentication information management service 202 checks a data string illustrated in FIG. 3 that contains the acquired ID. If it is determined that the user authentication information corresponding to the ID is stored in the database 204, the procedure proceeds to STEP S503. If it is determined that the user authentication information corresponding to the ID is not stored in the database 204, the procedure proceeds to STEP S508.

At STEP S503, the authentication information management service 202 acquires the user authentication information corresponding to the ID from the database 204. Then, at STEP S504, the authentication information management service 202 instructs the user authentication service 203 to perform login processing using the acquired user authentication information. For example, the user authentication service 203 sends the password contained in the acquired user authentication information to a user authentication server associated with the domain name contained in the acquired user authentication information.

At STEP S505, the authentication information management service 202 determines whether or not the login processing has successfully been completed on the basis of a result of the login processing sent from the user authentication server. The successful completion of the login processing means that the user who possesses the card is permitted to use the multifunction apparatus 100. After obtaining the permission, the user can use the various functions of the multifunction apparatus 100.

If, in STEP S505, it is determined that the login processing has not successfully been completed, the authentication information management service 202 deletes the ID obtained in the operation of STEP S501 and the corresponding user authentication information from the database 204, at STEP S506. Then, at STEP S507, the authentication information management service 202 displays an error notification indicating that the login processing has not successfully been completed on the operation display unit 113. In this case, where the login processing has not successfully been completed, the user cannot use the various functions of the multifunction apparatus 100.

Now, processing performed when user authentication information corresponding to an ID acquired from the card is not stored in the database 204 will be described.

If user authentication information corresponding to the ID acquired from the card is not stored, the procedure proceeds to STEP S508. At STEP S508, the authentication information management service 202 displays an input screen on the operation display unit 113 for prompting the user to input user authentication information.

FIG. 6 illustrates an example of the input screen displayed on the operation display unit 113. While the input screen is displayed on an LCD (Liquid Crystal Display) 601, the user can input a user name, a password, and a domain name using input keys 604. In the example of FIG. 6, a symbol "*" is displayed as a substitute of a part of an input password so that the password is not recognized by a third party.

The LCD 601 also displays an operation screen and soft keys. A touch panel sheet 602 is attached on the LCD 601 so that, when a key is depressed or touched, position information indicating the position of the depressed or touched key is transmitted to the core unit 111.

The operation display unit 113 also has a start key 603 which is used by the user for inputting a request such as a request for reading of an original image. When the login processing has been successfully completed, the user can use the various functions of the multifunction apparatus 100 by depressing the start key 603.

When the input of the user authentication information through the input screen is completed, the authentication information management service 202 acquires the user authentication information input by the user, at STEP S509. Then, at STEP S510, the authentication information management service 202 instructs the user authentication service 203 to execute login processing using the user authentication information input by the user. For example, the user authentication service 203 sends the user name and the password input through the input screen to a user authentication server corresponding to the domain name input through the input screen.

At STEP S511, the authentication information management service 202 determines whether or not the login processing has successfully been completed, on the basis of a result of the login processing sent from the user authentication server.

If, in STEP S511, it is determined that the login processing has successfully been completed, the authentication information management service 202 stores in the database 204 the ID acquired in the operation of STEP S501 and the user authentication information acquired in the operation of STEP S509 so as to be associated with each other, at STEP S512. Thereafter, the user can use the various functions of the multifunction apparatus 100.

If, in STEP S511, it is determined that the login processing has not successfully been completed, the procedure advances to STEP S513. At STEP S513, the authentication information management service 202 displays on the operation display unit 113 an error notification indicating that the login processing has not successfully been completed With the procedure described above, when an ID acquired from the card is stored in the database 204, login processing can immediately proceed without input of user authentication information, and thus ease of operability is increased.

On the other hand, when the ID is not stored in the database 204, input of the user authentication information is necessary. However, since the input user authentication information is automatically stored in the database 204, a user does not have to perform an additional operation for registering the user authentication information. That is, it is not necessary that an administrator or the like store the card ID and the user authentication information in the database 204 in advance. This also increases ease of operability in authentication processing. In addition, since the user authentication information is stored in the database 204 after the successful completion of login processing is verified, registration of unnecessary user authentication information in the database 204 can be prevented.

In the foregoing, the case is described where an ID for identifying a card is used for authentication processing. However, any information such as biometric information of a user (e.g., a fingerprint or an iris pattern) or authentication information composed of a user ID and a password can be used as long as it has an authentication function. When biometric information such as a fingerprint or an iris pattern is used instead of the ID, a device for reading the finger print or the iris pattern is substituted for the card reader 115.

Further, in the above description, the database 204 is contained in the multifunction apparatus 100. However, the database 204 can be located on a network, such that the multifunction apparatus 100 accesses the database 204 through the network 114.

According to the above exemplary embodiment, even when a print request is sent from a host computer while a printer controller is in a sleep mode, an image forming device is allowed to notify the host computer that the printer controller is in the sleep mode. Thus, the printer controller can be in the sleep mode while the host computer is operating. This permits reduction of power consumption of the printer controller. In addition, the controller can be configured in a manner such that processing the notification of the image forming device to the host computer, as mentioned above, is performed by another information processing apparatus.

Furthermore, the present invention can also be achieved by providing to a system or apparatus a storage medium that stores program code of software for realizing the functions of the above-described exemplary embodiment. The present invention can be achieved by causing a computer (or a CPU, MPU or the like) of the system or apparatus to read the program code from the storage medium and then to execute the program code.

In this case, the program code itself read from the storage medium realizes the functions of the embodiment described above, and thus the program code itself and a storage medium storing the program code constitute the invention.

In addition, the storage medium for providing the program code includes a flexible (floppy) disk, a hard disk, an optical disk, a magneto-optical disk, a CD-ROM, a CD-R, a CD-RW, a DVD-ROM, a DVD-RAM, a DVD-RW, a DVD-R, a magnetic tape, a non-volatile memory card, a ROM, etc.

Besides the program code read by the computer being executed to realize the functions of the above-described embodiment, the present invention includes an OS (operating system) or the like running on the computer performing an actual process in whole or in part according to instructions of the program code to realize the functions of the above-described embodiment.

Moreover, the program code read from the storage medium can be written to a memory contained in a function expansion board inserted into the computer or in a function expansion unit connected to the computer, so that the functions of the above-described exemplary embodiment can be implemented. In this case, a CPU or the like provided in the function expansion board or the function expansion unit performs an actual process in whole or in part according to instructions of the program code to realize the functions of the above-described exemplary embodiment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. An information processing apparatus which can communicate with an authentication server and access a database configured to store user identification information for identifying a user, first user authentication information necessary for the authentication server to authenticate the user, and second user authentication information for identifying the authentication server, the first and second user authentication information being associated with the user identification information, the information processing apparatus comprising:

a user identification information input unit configured to input user identification information for identifying the user;

a user authentication information input unit configured to input first user authentication information necessary for the authentication server to authenticate the user and second user authentication information for identifying the authentication server, the first and second user authentication information being input in a case where first and second user authentication information associated with the input user identification information have not been stored in the database;

a communication unit configured to (a) if first and second user authentication information associated with the input user identification information have been stored in the database, transmit, to the authentication server corresponding to the second user authentication information stored in the database, the first user authentication information stored in the database; (b) if first and second user authentication information associated with the input user identification information have not been stored in the database, transmit, to the authentication server corresponding to the input second user authentication information, the input first user authentication information; and (c) receive from the authentication server a result of authentication executed by the authentication server based on the transmitted first user authentication information; and a computer configured to control storage of the input user identification information and the input first and second user authentication information in the database in accordance with the result of authentication received from the authentication server if the first and second user authentication information associated with the input user identification information have not been stored in the database, wherein, when the input first user authentication information is transmitted to the authentication server corresponding to the input second user authentication information and the received result indicates success, the computer stores the input user identification information and the input first and second user authentication information in the database, and wherein, when the input first user authentication information is transmitted to the authentication server corresponding to the input second user authentication information and the received result does not indicate success, the computer does not store the input user identification information and the input first and second user authentication information in the database.

2. The information processing apparatus of claim 1, wherein the first user authentication information includes at least one of a user name and a password, and wherein the second user authentication information includes a domain name indicative of the authentication server to which the first user authentication information is transmitted.

3. The information processing apparatus of claim 1, wherein the user identification information includes an ID stored in a card which the user has possession of, biometric information based on a fingerprint of the user, or biometric information based on an iris of the user.

4. The information processing apparatus of claim 1, wherein, if the first user authentication information stored in the database is transmitted to the authentication server and the authentication result received from the authentication server does not indicate success, the computer deletes from the database the input user identification information and the first and second user authentication information associated with the input user identification information.

5. An authentication method performed by an information processing apparatus which can communicate with an authentication server and access a database configured to store user identification information for identifying a user, first user authentication information necessary for the authentication server to authenticate the user, and second user authentication information for identifying the authentication server, the first and second user authentication information being associated with the user identification information, the method comprising:

inputting, via a user identification information input unit, user identification information for identifying the user;

inputting, via a user authentication information input unit, first user authentication information necessary for the authentication server to authenticate the user and second user authentication information for identifying the authentication server, the first and second user authentication information being input in a case where first and second user authentication information associated with the input user identification information have not been stored in the database;

establishing communication between the information processing apparatus and the authentication server, via a communication unit, to (a) if first and second user authentication information associated with the input user identification information have been stored in the database, transmit, to the authentication server corresponding to the second user authentication information stored in the database, the first user authentication information stored in the database; (b) if first and second user authentication information associated with the input user identification information have not been stored in the database, transmit, to the authentication server corresponding to the input second user authentication information, the input first user authentication information; and (c) receive from the authentication server a result of authentication executed by the authentication server based on the transmitted first user authentication information; and controlling, using a computer, storage of the input user identification information and the input first and second user authentication information in the database in accordance with the result of authentication received from the authentication server if the first and second user authentication information associated with the input user identification information have not been stored in the database, wherein, when the input first user authentication information is transmitted to the authentication server corresponding to the input second user authentication information and the received result indicates success, the computer stores the input user identification information and the input first and second user authentication information in the database, and wherein, when the input user first authentication information is transmitted to the authentication server corresponding to the input second user authentication information and the received result does not indicate success, the computer does not store the input user identification information and the input first and second user authentication information in the database.

6. A non-transitory computer readable storage medium storing a computer program for controlling an information processing apparatus which can communicate with an authentication server and access a database configured to store user identification information for identifying a user, first user authentication information which is necessary for the authentication server to authenticate the user, and second user authentication information for identifying the authentication server, the first and second user authentication information being associated with the user identification information, the computer program causing a computer to execute the steps of:

controlling a user identification information input unit to input user identification information for identifying the user;

controlling a user authentication information input unit to input first user authentication information necessary for the authentication server to authenticate the user and second user authentication information for identifying the authentication server, the first and second user authentication information being input in a case where the first and second user authentication information associated with the input user identification information have not been stored in the database;

controlling a communication unit to establish communication between the information processing apparatus and the authentication server to (a) transmit, to the authentication server corresponding to the second user authentication information stored in the database, the first user authentication information stored in the database, if the first and second user authentication information associated with the input user identification information have been stored in the database; (b) transmit, to the authentication server corresponding to the input second user authentication information, the input first user authentication information if the first and second user authentication information associated with the input user identification information have not been stored in the database and (c) receive from the authentication server a result of authentication executed by the authentication server based on the transmitted first user authentication information; and controlling storage of the input user identification information and the input first and second user authentication information in the database in accordance with the result of authentication received from the authentication server if the first and second user authentication information associated with the input user identification information have not been stored in the database, wherein, when the input first user authentication information is transmitted to the authentication server corresponding to the input second authentication information and the received result indicates success, the computer stores the input user identification information and the first and second input user authentication information in the database, and wherein, when the input first user authentication information is transmitted to the authentication server corresponding to the second user authentication information and the received result does not indicate success, the computer does not store the input user identification information and the input first and second user authentication information in the database.

7. The computer readable storage medium of claim 6, wherein the first user authentication information includes at least one of a user name and a password, and wherein the second user authentication information includes a domain name indicative of the authentication server to which the first user authentication information is transmitted.

8. The computer readable storage medium of claim 6, wherein the user identification information includes an ID stored in a card which the user has possession of, biometric information based on a fingerprint of the user, or biometric information based on an iris of the user.

9. The computer readable storage medium of claim 6, wherein, if the first user authentication information stored in the database is transmitted to the authentication server and the authentication result received from the authentication server does not indicate success, the computer deletes from the database the input user identification information and the first and second user authentication information associated with the input user identification information.

10. An information processing apparatus which can communicate with an authentication server and access a database configured to store user identification information for identifying a user, first user authentication information necessary for the authentication server to authenticate the user, and second user authentication information for identifying the authentication server, the first and second user authentication information being associated with the user identification information, the information processing apparatus comprising:

a user identification information input unit configured to input user identification information for identifying the user;

a user authentication information input unit configured to input first user authentication information necessary for the authentication server to authenticate the user and second user authentication information for identifying the authentication server, the first and second user authentication information being input in a case where first and second user authentication information associated with the input user identification information have not been stored in the database;

a communication unit configured to (a) if first and second user authentication information associated with the input user identification information have been stored in the database, transmit, to the authentication server corresponding to the second user authentication information stored in the database, the first user authentication information stored in the database and (b) if first and second user authentication information associated with the input user identification information have not been stored in the database, transmit, to the authentication server corresponding to the input second user authentication information, the input first user authentication information; and a computer configured to, if the first and second user authentication information associated with the input user identification information have not been stored in the database, store the input user identification information and the input first and second user authentication information in the database.

11. The information processing apparatus of claim 10, wherein the first user authentication information includes at least one of a user name and a password, and wherein the second user authentication information includes a domain name indicative of the authentication server to which the first user authentication information is transmitted.

12. The information processing apparatus of claim 10, wherein the user identification information includes an ID stored in a card which the user has possession of, biometric information based on a fingerprint of the user, or biometric information based on an iris of the user.

13. The information processing apparatus of claim 10, wherein, if the first user authentication information stored in the database is transmitted to the authentication server and a result of authentication executed by the authentication server based on the transmitted first user authentication information does not indicate success, the computer deletes from the database the input user identification information and the first and second user authentication information associated with the input user identification information.

14. The information processing apparatus of claim 10, further comprising:

the database.

15. The information processing apparatus of claim 10, further comprising:

a scanner unit configured to read an image of an original document, wherein, if a result of authentication executed by the authentication server based on the transmitted first user authentication information indicates success, the computer permits the scanner unit to read the image.

* * * * *